(12) United States Patent
Wagner et al.

(10) Patent No.: US 9,730,058 B2
(45) Date of Patent: Aug. 8, 2017

(54) METHOD AND SYSTEM FOR PRODUCING A JAMMER SIGNAL

(71) Applicant: Kathrein-Werke KG, Rosenheim (DE)

(72) Inventors: Christian Wagner, Rosenheim (DE); Alexander Seeor, Rosenheim (DE); Martin Weckerle, Ulm (DE)

(73) Assignee: KATHREIN-WERKE KG, Rosenheim (DE)

( * ) Notice: Subject to any disclaimer, the term of this patent is extended or adjusted under 35 U.S.C. 154(b) by 0 days.

(21) Appl. No.: 15/184,331

(22) Filed: Jun. 16, 2016

(65) Prior Publication Data

US 2016/0373923 A1 Dec. 22, 2016

(30) Foreign Application Priority Data

Jun. 17, 2015 (GB) .................................. 1510625.5

(51) Int. Cl.
*H04W 12/02* (2009.01)
*H04W 72/04* (2009.01)
(Continued)

(52) U.S. Cl.
CPC .............. *H04W 12/02* (2013.01); *H04B 7/04* (2013.01); *H04K 3/43* (2013.01); *H04K 3/45* (2013.01); *H04K 3/822* (2013.01); *H04K 3/825* (2013.01); *H04W 72/0413* (2013.01); *H04K 2203/12* (2013.01); *H04K 2203/16* (2013.01); *H04K 2203/34* (2013.01); *H04W 88/085* (2013.01)

(58) Field of Classification Search
CPC ............. H04W 12/02; H04W 72/0413; H04W 88/085; H04B 7/04
See application file for complete search history.

(56) References Cited

U.S. PATENT DOCUMENTS 7,982,654 B2 7/2011 Low
8,433,273 B2 * 4/2013 Heinonen ............ H03G 3/3068
455/234.2

(Continued)

FOREIGN PATENT DOCUMENTS

EP 1051053 11/2000
EP 2432261 3/2012

(Continued)

OTHER PUBLICATIONS

GB Search Report issued in GB 15106255 on Nov. 23, 2015.
European Extended Search Report issued in EP Application No. 16175028.6 on Nov. 8, 2016.

*Primary Examiner* — Bobbak Safaipour
(74) *Attorney, Agent, or Firm* — Dann, Dorfman, Herrell and Skillman; Stephen Eland

(57) ABSTRACT

A distributed antenna system with a plurality of remote radio units is disclosed. The distributed antenna system includes a jammer signal generator for generating a jammer signal in at least one frequency range to be blocked on detection of an uplink signal in a coverage area, as well as at least one antenna element for transmitting the generated jammer signal in the coverage area. The jammer signal will ensure that any mobile devices or stations within the coverage area are unable to transmit radio signals as the frequency range(s) on which the radio signals should be transmitted are blocked by the jammer signal.

8 Claims, 5 Drawing Sheets

(51) Int. Cl.
*H04B 7/04* (2017.01)
*H04K 3/00* (2006.01)
*H04W 88/08* (2009.01)

(56) References Cited

U.S. PATENT DOCUMENTS

| | | | |
|---|---|---|---|
| 8,437,721 B2* | 5/2013 | Zeng | H04B 1/1027 455/260 |
| 8,744,336 B2* | 6/2014 | Patel | H04B 1/1027 455/1 |
| 8,781,426 B2* | 7/2014 | Ciccarelli | H04B 1/109 455/234.1 |
| 8,838,017 B2* | 9/2014 | Muthali | H03F 1/086 455/1 |
| 2003/0143943 A1 | 7/2003 | Kline | |
| 2005/0221790 A1* | 10/2005 | Persico | H04B 1/1615 455/343.2 |
| 2006/0267827 A1 | 11/2006 | Ferm et al. | |
| 2011/0183602 A1 | 7/2011 | Tietz | |
| 2013/0023201 A1 | 1/2013 | Coleman et al. | |

FOREIGN PATENT DOCUMENTS

| | | |
|---|---|---|
| WO | 98/56192 | 12/1998 |
| WO | 02/07120 | 1/2002 |
| WO | 03/055116 | 7/2003 |
| WO | 2014/128692 | 8/2014 |
| WO | 2014/149120 | 9/2014 |
| WO | 2014/026005 | 12/2014 |

* cited by examiner

METHOD AND SYSTEM FOR PRODUCING A JAMMER SIGNAL

PRIORITY APPLICATIONS

This application claims priority to and benefit of UK Patent Application No. 1510625.5 filed on 17 Jun. 2015. The entire disclosure of the foregoing application is hereby incorporated herein by reference.

FIELD OF THE INVENTION

The invention relates to a remote radio unit for transceiving telecommunication signals, which has a jammer signal transmitter for generating and transmitting a jammer signal. The invention further relates to a distributed antenna system including one of the remote radio units with the jammer signal transmitter and a method for generating a jammer signal for transmission in one of the remote radio units. Other non-limiting aspects of the invention relate to a central jammer signal transmitter for generating jammer signals within the distributed antenna system system and the method of transmitting the jamming signals or the jamming signal to the remote units in order to relay the jamming signals into a remote unit coverage area.

BACKGROUND OF THE INVENTION

Increasing use of mobile telecommunications in business life has substantial advantages because of its convenience. One of the risks is, however, unauthorized interception, such as eavesdropping or the unauthorized reception of telephone calls and data transmission. Eavesdropping is the use of a mobile device, such as a smartphone, as a listening device to overhear a conversation.

A number of methods and devices have been developed in order to overcome this unauthorized interception. For example, it is possible to sweep regularly rooms or buildings for listening devices, which may have been installed in the rooms and/or on the communication networks to the rooms or building. It is possible to construct one or more rooms in a building with a Faraday cage to prevent electromagnetic waves from entering or exiting the room or the building. It is also possible to generate random noise over a wide variety of radio frequencies to block any transmission or reception of any mobile devices/stations, such as smartphones or mobile telephones within a particular area.

These prior art methods have a number of issues associated with them. For example, the construction of a Faraday cage within a building is extremely expensive and is not practical in many cases. Regular sweeping of buildings for listening devices can be costly and is never 100% effective. Blanket jamming of all radio frequencies can also lead to interference of acceptable communication devices and also conflict with other users of telecommunication networks. It would therefore be desirable to develop a system, based on existing mobile telecommunication systems, which blocks telecommunications calls in a limited coverage area and within a defined time frame, thus preventing substantially eavesdropping or other unauthorized interception.

A smart signal jammer is, for example, known from U.S. Pat. No. 7,982,654 B2 which discloses the transmission of one or more jamming signals in one or more temporal transmission patterns of pulses and is able to jam any unwanted signals in its range. One or more of the smart signal jammers of this patent must be distributed throughout the building in order to ensure that all of the signals in the building are sufficiently jammed. The installation of a number of the signal jammers can be expensive and can also disturb telecommunication signals outside of the building, which will disrupt calls and data transmission of 'normal' users.

This issue of disturbing the telecommunication signals for other users outside of the intended range of the jamming signals in which the telecommunication signals are to be blocked is serious, as it can lead to a number of complaints to the telecommunication operators. There is therefore a need to reduce this disturbance as much as possible.

The distributed antenna system of this disclosure can be used to secure business, military or government meeting rooms from eavesdropping. The distributed antenna system could also be permanently installed in prisons or trading rooms in which no communication through mobile stations is allowed.

SUMMARY OF THE INVENTION

A distributed antenna system with a plurality of remote radio units is disclosed in this document. The remote radio units transceive (transmit and receive) telecommunication signals in a coverage area and can comprise a jammer signal generator for generating a jammer signal in at least one frequency band to be blocked on detection of an uplink signal in the coverage area, as well as at least one antenna element for transmitting the generated jammer signal in the coverage area. The jammer signal will ensure that any mobile devices or stations within the coverage area are unable to transmit radio signals as the frequency band(s) on which the radio signals should be transmitted are blocked by the jammer signal. Thus any mobile station within the coverage area is rendered ineffective.

The jammer signal generator can be either a local jammer signal generator present in one or more of the remote radio units in the distributed antenna system, or the jammer signal generator could be a central jammer signal generator, which distributes the jammer signal throughout the distributed antenna system on a distribution network or only within limited coverage areas of the distributed antenna system. This degree of flexibility enables the generation of the jammer signal to be localized only in those areas of the coverage area in which the jammer signal is required, i.e. in the areas in which the mobile station is localized and communication to the mobile station should be prohibited or distorted. This reduces the risk of interference to normal users outside of the distributed antenna system and will also allow the distributed antenna system to be used normally in areas in which normal telecommunications are allowed.

In one aspect of the disclosure, the remote radio units are located on the inside of external walls of a building to ensure that the mobile station within the coverage area served by the distributed antenna system connects preferentially to the distributed antenna system and not to another antenna located outside of the building.

The disclosure also teaches a method for generating a jammer signal in at least one frequency band to be blocked within a coverage area. This method comprises determining the at least one frequency band to be blocked on reception of an uplink signal in the frequency band corresponding to the at least one frequency band to be blocked, generating the jammer signal in the at least one frequency band and then transmitting the jammer signal through at least one antenna element in the coverage areas.

In one aspect of the disclosure, the jammer signal is amplified at different levels in different ones of the frequency bands.

The strength of the jammer signal in the blockable frequency band can be maintained until the uplink signal from the mobile station is no longer detected in the coverage area. In one aspect of the invention, the strength of the jammer signal is reduced in stages when the uplink signal is no longer detected. Should the uplink signal be detected, then the strength of the jammer signal can be increased again. This enables the strength of the jammer signal to be dynamically adjusted and only be as strong as required to block the mobile station within the coverage area and to minimize interference with other users outside of the coverage area.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that the features of one aspect or embodiment of the invention can be combined with a feature of a different aspect or aspects and/or embodiment of the invention.

Figure 1A:
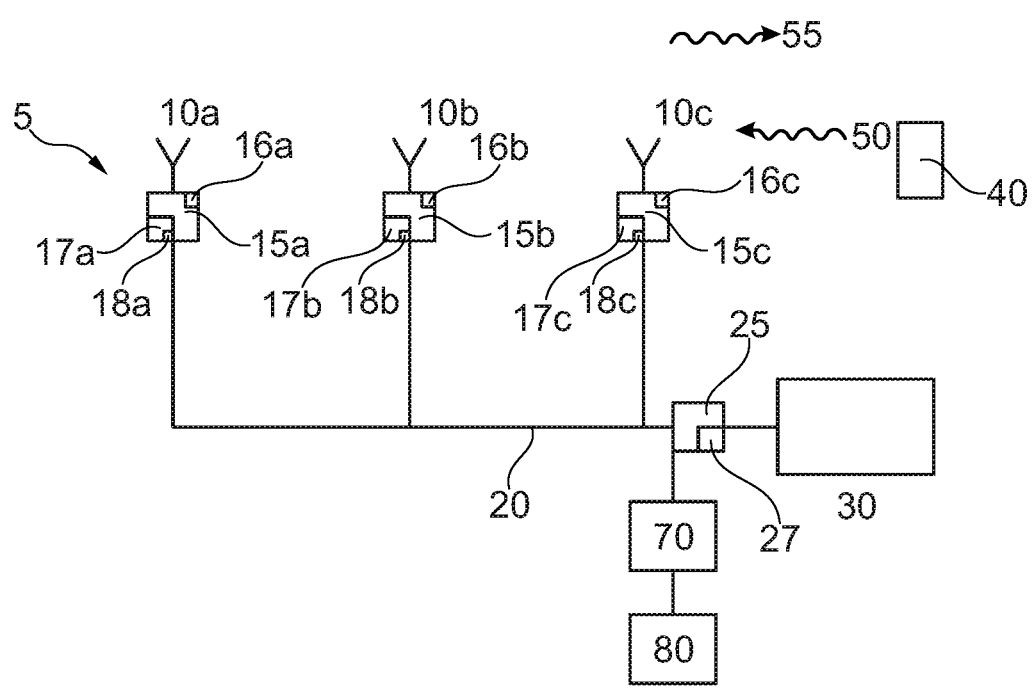
FIG. 1A shows a simplified aspect of a distributed antenna system of the disclosure including a jammer signal generator.

FIG. 1A shows a simplified aspect of a distributed antenna system 5 incorporating the features of this disclosure. The distributed antenna system 5 has a plurality of antenna elements 10a-c connected to a corresponding remote radio unit 15a-c. The remote radio units 15a-c have a radio unit for transmitting or receiving telecommunication signals in one or more frequency bands, or frequency ranges with the frequency band. The antenna elements 10a-c are distributed, for example, throughout a building in which transmission or reception of telecommunication signals should be blocked or prevented. It is at least conceivable that the antenna elements 10a-c could be distributed over several buildings or over a campus, to prevent the transmission or reception of telecommunication signals in a wider area. This may be unacceptable because of the risk of disturbing telecommunication signals outside of the building or the wider area.

The remote radio units 15a-c are connected to a central hub 25 over a distribution network 20. The distribution network 20 could be either a digital network or an analog network. The remote radio units 15a-c may also include a digital to analog converter and the central hub 25 may also include an analog to digital converter. This is not limiting of the invention and it is possible to use completely digital distributions networks or a mixture of analog/digital networks with appropriate analog to digital converters and digital to analog converters.

The central hub 25 is connected to one or more base stations 30. In FIG. 1A only a single base station 30 is shown, but this is not limiting of the invention. It will be appreciated that the term base station 30 in this disclosure encompasses not only base transceiver stations, as known in the GSM protocol, but also Node Bs, as known in UMTS protocol, and eNode Bs, as known in the LTE protocol, and similar units in other wireless protocols, such as but not limited to IEEE 802.1x Wi-Fi systems. A single channel is shown connected over the central hub 25 and the base station 30, but multiple channels could be connected in order to connect more than one base station 30 or a MIMO station.

Suppose now that a mobile station or mobile device 40, such as a smartphone or a mobile telephone or other transmitting device, enters the coverage area covered by one or more of the remote radio units 15a-c. The mobile station 40 will transmit an uplink signal 50 as the mobile station 40 wishes to connect into the coverage area served by one or more of the remote radio units 15a-c in the distributed antenna system 5. The uplink signal 50 will be relayed from one or more of the antenna elements 10a-c receiving the uplink signal 50 to a receiver 16a-c in the remote radio unit 15a-c and then through the distribution network 20 to the central hub 25. The central hub 25 will detect the presence of the mobile station 40 in the coverage area and can also note the frequency band on which the mobile station 40 is transmitting the uplink signal 50. A non-limiting example of the frequency bands are those used by the 3GPP protocol as defined by the 3GPP—$3^{rd}$ generation partnership project.

A monitoring device 70 connected to the central hub 25 will record that the mobile station 40 has entered a coverage area in which the mobile station 40 should not be transmitting or receiving telecommunication signals and will cause a jammer signal 55 to be generated on one or more of the frequency bands for downlink signals to the mobile station 40 corresponding to the frequency band of the uplink signal 50. This jammer signal 55 will prevent reception of telecommunication signals by the mobile station 40 in the one or more of frequency bands, whilst the mobile station 40 is present in the coverage area. The mobile station 40 will merely show "no signal" rather than the name of the operator. Thus, the mobile station 40 cannot receive or transmit any telecommunication signal whilst in the coverage area and thus in the range of the distributed antenna system 5 served by the central hub 25.

The mobile station 40 will be connected to the distributed antenna system 5 while it is in the coverage area. As the mobile station 40 moves away from the coverage area served by the distributed antenna system 5, it is likely that the uplink signal 50 will attempt to connect to a further antenna element in another cell or coverage area. Let us assume that this further antenna element is in an area in which reception and/or transmission or telecommunication signals by the mobile station 40 is allowed, and is not to be blocked. In this "unblocked" coverage area, the mobile station 40 will be able to lock into the new cell and will no longer be blocked due to the transmission of the jammer signal 55.

Once the movement of the mobile station 40 into an "unblocked area" has happened the monitoring device 70 will note the absence of the uplink signal 50 from the mobile station 40 and will cause a reduction the strength of the jammer signal 55 (or removal of the jammer signal 55 entirely). In this context, the term "absence of the uplink signal 50" means that the signal 50 falls below a certain threshold level due to the movement of the mobile station 40. It is possible that a small signal 50 will still be detected, but the mobile station should be out of range and in an area in which communication is allowed.

The jammer signal 55 can either be generated by one or more individual local jammer signal generators 17a-c present in one or more of the remote radio units 15a-c or the jammer signal 55 could be generated by a central jammer signal generator 27 situated in the central hub 25. The jammer signal 55 can be either generated by a random noise generator or could be a stored random pattern. The one or more individual local jammer signal generators 17a-c and/or the central jammer signal generator 27 can be directly addressed from the monitoring device 70 and are provided with interfaces 18a-18c to receive instructions from the monitoring device 70.

Figure 1B:
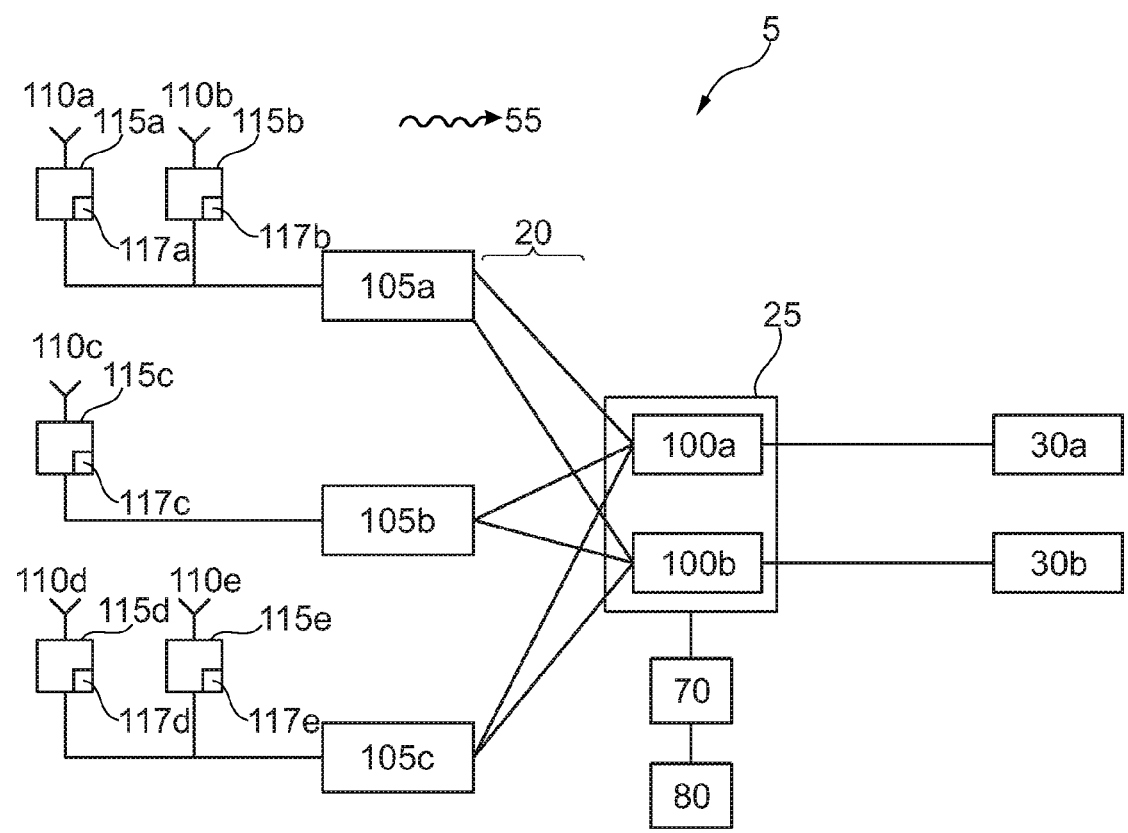
FIG. 1B shows a further aspect of the distributed antenna system of the disclosure in which the distributed antenna system is connected to base stations or a MIMO device.

FIG. 1B shows a further aspect of the invention in which there are two base stations 30a and 30b that are connected to the central hub 25 in the distributed antenna system 5. The central hub 25 has a first hub module 100a and a second hub module 100b. Each one of the base stations 30a and 30b is connected to one of the first hub module 100a or the second hub module 100b. It will be appreciated that the first hub module 100a and the second hub module 100b could each be separately connected to a different channel of a MIMO system.

As explained in the Applicant's co-pending application, GB 1414280.6 the number of the base stations 30a and 30b as well as the number of hub modules 100a and 100b is not limiting of the invention. The central hub 25 is connected over the distribution network 20 to one or more expansion units 105a-c to which a plurality of remote radio units 115a-115e are connected. The one or more expansion units 105a-c are adapted pass the same telecommunication signals to the connected ones of the remote radio units 115a-e and the corresponding antenna element 110a-e. As noted above, the communication between the central hub 25 and the expansion units 105a-c is, in one aspect of the invention, in the digital domain and is reconfigurable. A digital-to-analog conversion is provided in the expansion units 105a-c and the communication between the expansion units 105a-c and the plurality of antenna elements 110a-e is, in one aspect of the invention in the analog domain.

The connection between the central hub 25 and the plurality of expansion units 105a-c is reconfigurable. The one or more remote radio units 115a-e each have, if required, a local jammer signal generator 117a-e which functions, as described earlier, to produce the jammer signal 55 and thus jam any mobile stations 40 detected by the monitoring system 5 within the coverage area covered by the distributed antenna system 5. The remote radio units 115a-c will also have a receiver, which is not shown in figure for simplicity.

The central hub 25 and the connected expansion units 105a-c enable the telecommunication signals from the base stations 30a and 30b to be distributed throughout the distributed antenna system 5. As described in the Applicant's co-pending patent application No. GB 1414280.6, the distributed antenna system 5 is highly flexible and allows a reconfiguration of the coverage areas if one or more of the remote radio units 105a-e are unavailable.

Furthermore, the distributed antenna system 5 as shown in FIG. 1B enables the jamming of the entering mobile station 40 in only a limited coverage area covered by the distributed antenna system 5. For example, it is possible that only one or more rooms/corridors/wings of the building need to be unavailable for communication. In this case, it will be possible to configure the distributed antenna system 5 such that the jammer signal is only sent to those remote radio units 115a-115b connected to the expansion unit 105a serving the coverage area in which the mobile stations 40 are blocked.

The coverage areas served by the other ones of the expansion units 105b and 105c will be able to relay any telecommunication signals between the antenna elements 110c e and one of the mobile stations 40 in the coverage area served by the antenna element 110c-110e.

Figure 2:
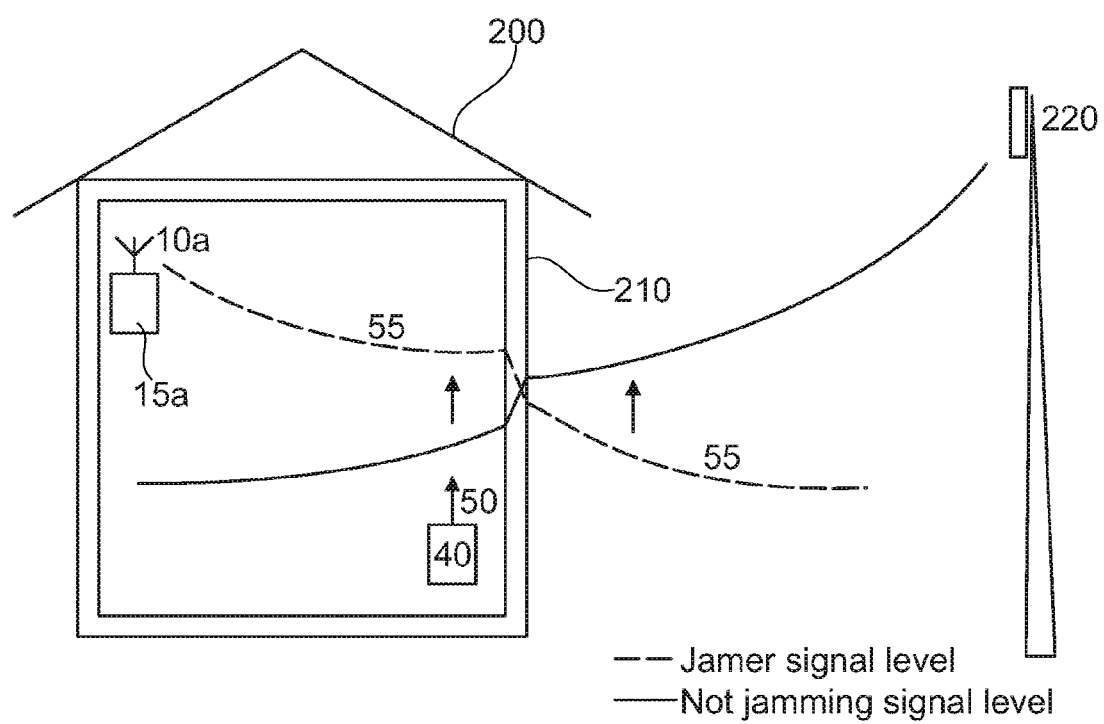
FIG. 2 shows an ideal jamming situation.

FIG. 2 shows an ideal jamming situation in which the mobile station 40 is present within the coverage area in a building 200. The mobile station 40 sends the uplink signal 50 which is picked up by one of the antenna elements 10 connected to the remote radio unit 15. Only one antenna element 10a and one remote radio unit 15a is shown for simplicity on this figure. The single reference numerals 10 and 15 are used to denote the plurality of the antenna elements 10a-c and 110a-e as well as the remote radio units 15a-c and 115a-e depicted in FIGS. 1A and 1B. The remote radio unit 15 includes the receiver 16 which will detect the presence of the received uplink signal 50 within the coverage area of the building 200 and pass the information to the monitoring device 70. The monitoring device 70 arranges for transmission of a jamming signal 55 at a level within the coverage area of the building 200, which is sufficient to disturb the downlink communication to the mobile station 40 in such a way that the mobile station 40 cannot connect to the telecommunications network through an external antenna 220 (or indeed any antenna), since the mobile station 40 is no longer receiving any cell information form the telecommunications network. The level of the jammer signal 55 needs to be higher than the regular/undisturbed downlink signal coming from any one of the external antennas 220 of the same or any other telecommunications network to ensure that the mobile station 40 cannot decode the signal from the external antenna 220 and, furthermore, to prevent that the mobile station 40 is connecting to the cell or network provided by the external antenna 220. This is shown in the figure in which the signal level of the jammer signal 55 is shown as a dashed line and is much higher than the signal level (continuous line) from the external antenna 220 without the jammer signal 55. The antenna is shown as an external antenna 220 mounted to a cell tower in FIG. 2, but this is not limiting of the invention and other external or internal antennas could be used and the antennas can be mounted, for example, on buildings or cell towers.

In the example shown in FIG. 2 the external antenna 220 is positioned outside of the building 200. The external antenna 220 serves "normal" users of the telecommunications network and it is undesirable that the reception of these normal users outside of the building 200 is affected by the jamming signal 55. The presence of the exterior wall 210 between the mobile station 40 and the external antenna 220 means that the downlink signal 50 from the antenna 220 will be attenuated when going through the exterior wall 210. This means that is highly likely that the mobile station 40 will be unable to receive any useful cell or network information and, hence, the mobile station 40 will not know how to connect with the network served by the external antenna 220. The attenuation of the uplink signal from the mobile station 40 will also be attenuated by the exterior wall 210, which will also help prevent the mobile station 40 from connecting to the external antenna 220, even if the mobile station 40 might still attempt to transmit, since the uplink power level from the mobile station may not be strong enough to reach the external antenna 220.

In the same way, the jammer signal 55 is attenuated when going through the exterior wall 210, which helps to mitigate any unwanted disturbance of a user located outside of the building 220. It will be noted that, outside the building 220, the jammer signal 55 can still be detected at a much lower level. In this example, the jammer signal 55 is still present at a level indicated by the dotted line in FIG. 2. However, the signal level of the "normal" telecommunications network served from the external antenna 220 is much higher than the signal level of the jammer signal 55 and thus mobile stations 40 outside of the building 200 will connect to the external antenna 220 and not be jammed. The mobile stations 40 will not connect to the antenna element 10a since the antenna element 10a is not providing any cell information to enable the mobile station 40 to connect. However, the presence of the jammer signal 55 outside of the building 200 will lead to a bad signal to noise ratio and thus diminish data rate at the mobile station 40. It will be noted that the external antenna 220 shown in FIG. 2 is merely representative of a plurality of antennas 220 probably located in the region of the building 200 to which the mobile station 40 could connect.

One issue that may occur in some buildings 200 is the presence of a window 230 in the exterior wall 210 of the building 200. It is known that telecommunication signals are not attenuated as much through the windows 230 as they are through the exterior walls 210. There is therefore a risk that the mobile station 40 in the room will connect to the external antenna 220 because the downlink signal received from the external antenna 220 by the mobile station 40 is higher than the jammer signal 55. The mobile station 40 in these circumstances could decode the cell information and connect to the telecommunications network via the external antenna 220. This will mean that the jammer signal 55 from the antenna 10 of the remote radio unit 15 inside of the building 200 will need to be at a much higher level than the jammer signal 55 would be in a window less building 200. This is indicated by the arrow c.

The presence of the jammer signal 55 will also be more marked outside of the building 200 with the window 230, because the jammer signal 55 will also not be attenuated as much through the window 230. This could mean a higher degree disturbance of the telecommunications signals outside of the building 200 and thus disturb the reception of telecommunications signals for "normal" users and lower the data rate for these users.

Figure 3:
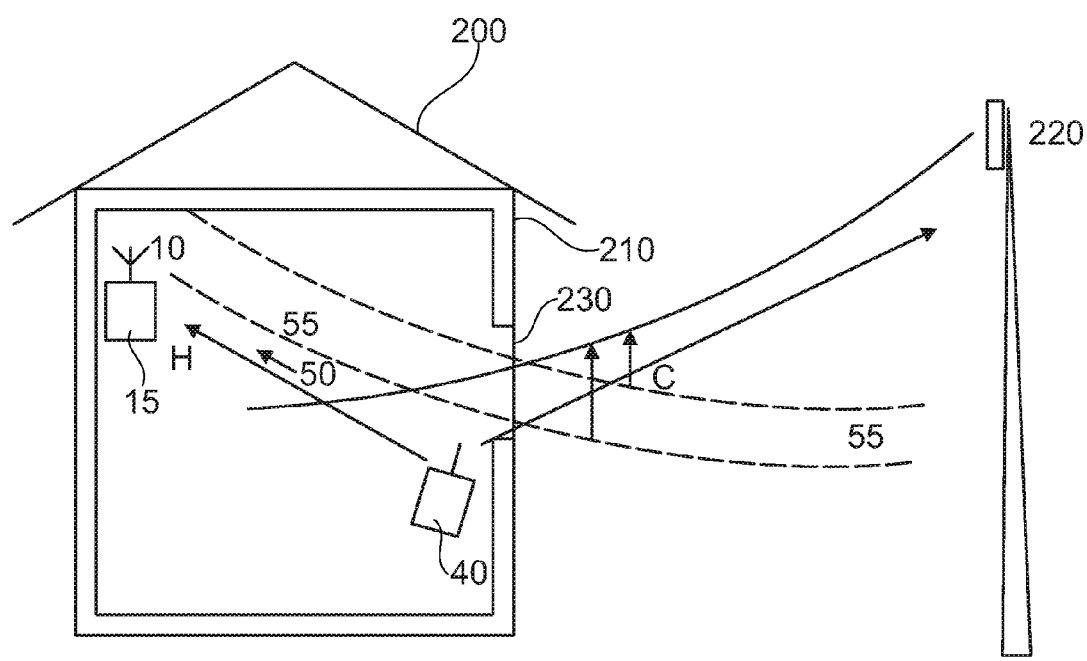
FIG. 3 shows a jamming situation in which the jamming signal level is temporally increased.

One way of solving the issue is demonstrated in connection with FIG. 3. In this example, the remote radio unit 15 is positioned close to the window 230, for example on the inside of the exterior wall. This positioning will allow a lower level of jammer signal 55 to be generated, but of course will mean that the jammer signal 55 will still penetrate outside of the building 200.

It would also be possible to coat the windows, for example, with a metallic layer, to increase the attenuation of the telecommunication signals passing through the window.

Figure 4:
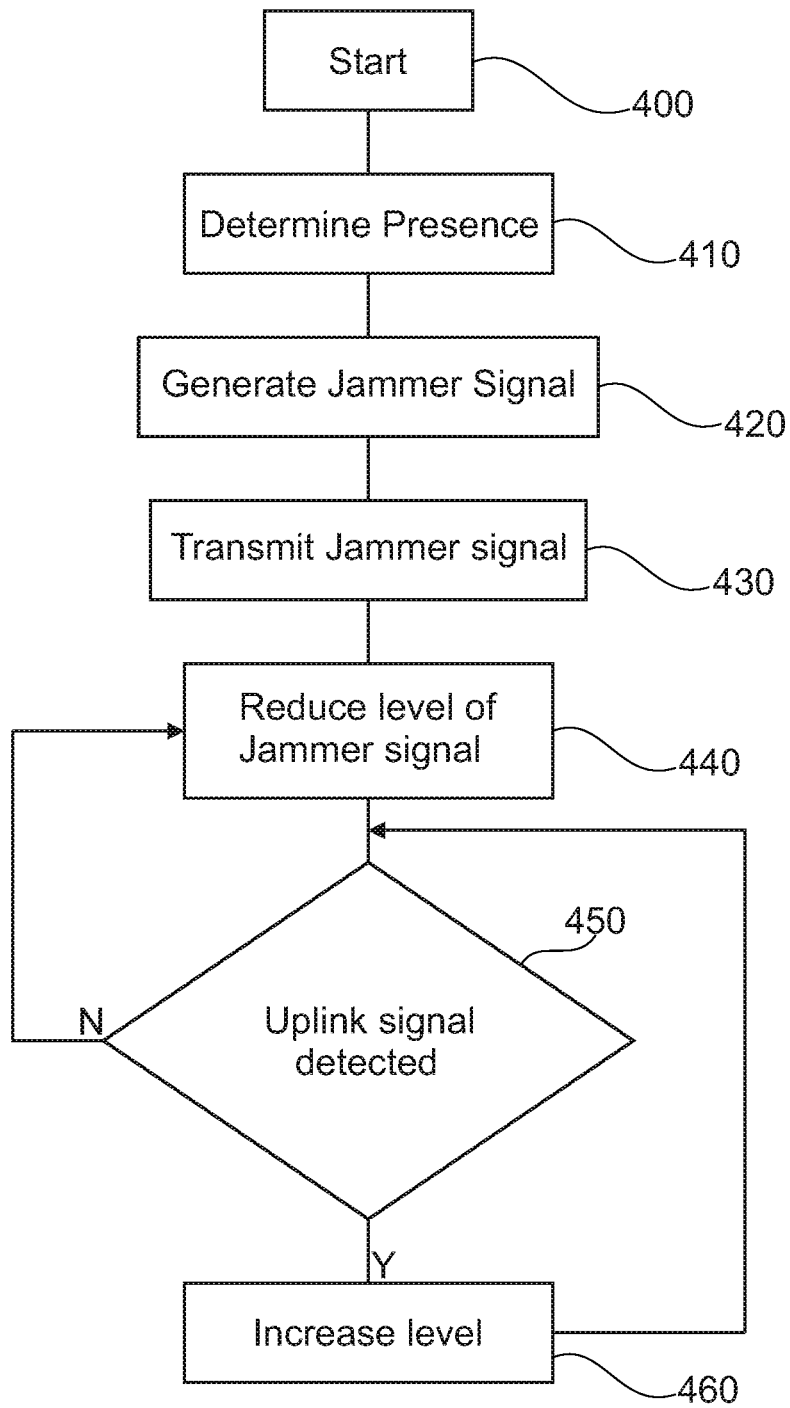
FIG. 4 shows a method for generating the jammer signal of the disclosure.

A further possibility is to adjust dynamically the level of the jammer signal 55 as requires and this method is shown in FIG. 4.

The method of FIG. 4 starts at element 400. It is known that if a mobile station 40, such as but not limited to a phone for connection to one of the GSM, UMTS or LTE telecommunication networks, is switched on from scratch then the mobile station 40 will not transmit until the mobile station 40 detects an antenna, such as the external antenna 220 mounted on the cell tower shown in FIG. 2. The mobile station 40 needs to know the frequency on which to transmit in order to try and make an access attempt to connect to the telecommunications network. There is also general wireless device requirement not to transmit until the mobile stations 40 knows its location and whether the mobile station 40 is authorised to transmit. As a result, until the mobile station 40 can actually read a network id and determine the country and network of the received network id, then the mobile station 40 will do nothing. However, once the mobile station 40 has detected an antenna and has determined its access frequency, the mobile station 40 will transmit at a relatively high power to try and connect to the telecommunications network served, for example, by the external antenna 220.

Once connected to the telecommunications network, if the mobile station 40 thinks that the mobile station 40 has dropped a call (perhaps going into a tunnel), the mobile station 40 will try and re-attach to the previous telecommunications network for a time before going to idle. So, if there is no signal, i.e. below a threshold value rather than a very weak signal, the mobile station 40 will not transmit. At least in the case of the GSM protocol there is an exponentially increasing set of gaps before the mobile station 40 listens again to try and find a signal, in order to save power. Consequently, if the power of the jammer signal 55 is high enough that the mobile station 40 cannot decode any cell ID, the mobile station 40 will not transmit in uplink and no signal will be detected from the mobile station 40. If the power is not high enough in the jamming signal 55, then the mobile station 40 will immediately trying to connect to the telecommunications network with a quite high uplink power. This could be easily detected by the monitoring device 70 and the power of the jamming signal 55 can be increased.

In step 410 the presence of the uplink signal 50 from one of the mobile stations 40 in the coverage area is determined as described previously by the receivers 10a-c and passed to the monitoring device 70. In step 420 the jammer signal 55 is generated. As noted previously, the jammer signal 55 could be either generated by the central jammer signal generator 27 in the central hub 25 and redistributed to one or more of the remote radio units 15a-c, 115a-e or the jammer signal 55 could be generated by the local jammer signal generator 17a-c in the remote radio units 15a-c, 115a-e. The jammer signal 55 is then transmitted in step 430 over one or more of the antenna elements 10, 10a-c, 110a-e. After a period of time the level of the jammer signal 55 can be slightly reduced in step 140 and the presence or absence of the uplink signal 50 can be determined in step 450 using the monitoring device. Should the uplink signal 50 from the mobile station 40 still be detected, then the level of the jammer signal 55 can be increased again in step 460 for a short period of time before a check is made again whether by checking detection of the uplink signal 50 whether the mobile station 40 is still present in the coverage area.

Should no uplink signal 50 from any of the mobile stations 40 be detected in the coverage area, then the level of the jammer signal 55 can be reduced again in step 440 and detection of the uplink signal 50 carried out again in step 450.

The method illustrated in FIG. 4 means that the strength of the jammer signal 55 is dependent on presence or absence of any of the mobile stations 40 in the coverage area and can be dynamically adapted. This means that disturbance of the mobile telecommunications signal outside of the building 200 is reduced.

It will be appreciated that the jammer signal 55 does not need to be transmitted over all possible frequencies. For example, it is possible to only transmit the jammer signal 55 over those frequency bands (or frequency ranges thereof) associated with mobile telecommunications operators, but still allow telecommunication signals on the frequency bands for the emergency services, i.e. Tetra frequency bands (390-395 MHz), and/or Wi-Fi systems. There is of course a small risk associated with these exceptions.

REFERENCE NUMERALS

5 Distributed antenna system
10a-c Antenna element
15a-c Remote radio unit
16a-c Receiver
17a-c Jammer signal generator
18a-c Interface
20 Distribution network
25 Central hub
30 Base station
40 Mobile station
50 Uplink signal
55 Jammer signal
70 Monitoring device
105a-c Expansion unit
115a-e Remote radio unit
200 Building
210 Exterior wall
220 External antenna
230 Window

The invention claimed is:

1. A distributed antenna system for relaying telecommunications signals in a coverage area comprising:
   a central hub connectable to one or more base stations;
   a plurality of remote radio units for relaying the telecommunications signal in the coverage area;
   a receiver for detecting presence of an uplink signal from a mobile station in at least a part of the coverage area, the uplink signal being in at least one frequency range;
   a monitoring device connected to the central hub and configured to cause the jammer signal to be generated in said at least one frequency range to be blocked; and
   at least one jammer signal generator for generating a jammer signal in said at least one-frequency range to be blocked in at least part of the coverage area, the jammer signal generator being configured to generate the jammer signal on receipt of the uplink signal in the coverage area, and to increase strength of the jammer signal in the at least one frequency range to be blocked until the uplink signal from the mobile station is no longer detected in the coverage area, wherein the at least one jammer signal generator is further configured to amplify the jammer signal at different levels in different ones of frequency ranges.

2. The distributed antenna system of claim 1, wherein the plurality of remote radio unit is located on the inside of external walls of a building.

3. The distributed antenna system of claim 1, wherein at least one of the plurality of remote radio units has a local jammer signal generator.

4. The distributed antenna system of claim 1, wherein the at least one jammer signal generator is located in the central hub.

5. A method for generating a jammer signal in at least one frequency range to be blocked in a coverage area covered by at least one remote radio unit, the method comprising:
   determining the at least one frequency range to be blocked in the coverage area on receipt of an uplink signal in the coverage area by the at least one remote radio unit;
   said determination of the at least one frequency range to be blocked comprising detecting a presence of a mobile station in at least a part of the coverage are transmitting an uplink signal in the at least one frequency range to be blocked
   generating the jammer signal in the at least one frequency range; and
   transmitting the jammer signal through the at least one remote radio unit into the coverage area, increasing strength of the jammer signal in said at least one frequency range to be blocked until the uplink telecommunications signal from the mobile station is no longer detected in the coverage area.

6. The method of claim 5, wherein the generating of the jammer signal is carried out at a central hub and the jammer signal is relayed through a distribution network to one or more of the at least one remote radio unit.

7. The method of claim 5, wherein the generating of the jammer signal is carried out in the remote radio unit connected to at least one antenna element and the jammer signal is relayed through the connected at least one antenna element.

8. The method of claim 5, wherein the jammer signal is a random noise signal.

* * * * *

UNITED STATES PATENT AND TRADEMARK OFFICE
CERTIFICATE OF CORRECTION

PATENT NO. : 9,730,058 B2  
APPLICATION NO. : 15/184331  
DATED : August 8, 2017  
INVENTOR(S) : Christian Wagner Page 1 of 1

It is certified that error appears in the above-identified patent and that said Letters Patent is hereby corrected as shown below:

In the Claims

Claim 5, Line 22:
"coverage are transmitting"
Should read:
-- coverage area transmitting --.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*